United States Patent [19]
Dunn

[11] Patent Number: 6,058,658
[45] Date of Patent: May 9, 2000

[54] FREE STANDING BARBECUE GRILL COVER

[76] Inventor: Michael Wallace Dunn, 18 McBride Rd., Litchfield, Conn. 06759

[21] Appl. No.: 09/168,264

[22] Filed: Oct. 8, 1998

[51] Int. Cl.[7] .................................................. E04B 7/00
[52] U.S. Cl. ........................... 52/23; 52/3; 52/4; 52/79.1; 52/DIG. 11; 52/DIG. 14
[58] Field of Search ........................... 52/3, 23, DIG. 14, 52/DIG. 11, 79.1, 4

[56] References Cited

U.S. PATENT DOCUMENTS

| D. 377,136 | 1/1997 | Knuth | D7/402 |
|---|---|---|---|
| 4,438,606 | 3/1984 | Chardon et al. | 52/79.1 |
| 5,245,801 | 9/1993 | Boesvert | 52/63 |
| 5,737,880 | 4/1998 | Hayes et al. | 52/79.1 |

*Primary Examiner*—Christopher T. Kent
*Assistant Examiner*—Nkeisha J. Maddox
*Attorney, Agent, or Firm*—Joseph J. Kaliko

[57] ABSTRACT

The outdoor barbecue cooking grill cover of the present invention includes a free standing cover which is designed to fit over the grill with an air space between the grill and the cover. The cover is designed to rest on the ground or a platform sitting on the ground; and is intended to cover the entire grill including the legs of the grill, and prevent the effects of whether from attacking the grill. A presently preferred outdoor barbecue cooking grill cover is made of heat resistant molded rigid plastic, has integral handles, is weighted at the bottom, includes at least one horizontal surface which can be used as a counter, and is vented in a manner to allow air to circulate between the cover and the grill but will still keep out rain and snow. According to another embodiment of the invention, tie down loops are provided on the cover so that it may be tied down to a deck, retaining rings or the like.

12 Claims, 5 Drawing Sheets

FREE STANDING BARBECUE GRILL COVER

BACKGROUND OF THE INVENTION

1. Field of the Invention

The invention relates to outdoor barbecue cooking grills. More particularly, the invention relates to a free standing cover for an outdoor barbecue cooking grill.

2. State of the Art

Outdoor cooking is very popular throughout the country and in most suburban areas outdoor barbecue cooking grills are ubiquitous. The state of the art outdoor barbecue cooking grills are typically one of three styles.

Prior art FIG. 1 shows a typical charcoal kettle style outdoor barbecue cooking grill 10. The grill 10 has a substantially hemispherical fire box 12, a removable dome cover 14, and three legs 16, 18, 20. Two of the legs 18, 20 are provided with wheels 22, 24 and the fire box 12 is provided with a handle 26 so that the grill 10 may be easily located.

Prior art FIG. 2 shows a hybrid charcoal-gas grill 30. The grill 30 has a substantially hemispherical fire box 32, a removable dome cover 34, and is integrated within a table-like structure 36. The table-like structure 36 has four legs 38, 40, 42, 44, two of which have wheels 46, 48. A small propane gas tank 50 is mounted beneath the table-like structure 36 and is coupled to a small burner 52 and a charcoal starter 54.

The most popular style of outdoor barbecue cooking grill is the rectangular gas grill 60 shown in prior art FIG. 3. This model has a rectangular fire box 62 and a hinged rectangular lid 64. The fire box 62 is supported by four legs 66, 68, 70, 72, two of which have wheels 74, 76. A large propane gas tank 78 is supported between the legs 70 and 72 and is covered by a control panel 80 which is cantilevered next to the fire box. A cantilevered food shelf 82 extends out from the other side of the fire box 62 providing a somewhat symmetrical appearance.

Although these grills are designed for outdoor use, steps must be taken to protect them from severe weather. Prolonged exposure to rain, snow, and/or ice will cause rust and will shorten the useful life of the grill.

Some people are fortunate enough to have extra garage or shed storage space in which to house their outdoor barbecue cooking grill during inclement weather. However, most people simply leave the grill outdoors and cover it.

State of the art grill covers are shown in prior art FIGS. 4–6. The typical cover 90 for a kettle grill 10 is essentially a vinyl or canvass bag which is inverted over the grill as shown in FIG. 4.

The typical cover 92 for a hybrid rectangular grill 30 is essentially a fitted vinyl or canvass bag which is inverted over the grill as shown in FIG. 5.

The typical cover 94 for a rectangular gas grill 60 is a fitted elasticized vinyl or canvass bag which is inverted over the grill as shown in FIG. 6.

State of the art grill covers have several disadvantages. First, they do not completely protect the grill. As seen in FIGS. 4–6, none of the covers protects the legs of the grill. Some of the covers, e.g. 94, leave virtually all of the lower portion of the grill 60 including the gas tank 78 uncovered. The loose fitting cover 90 offers very little protection against wind and rain.

Second, the close fitting vinyl covers may actually promote rust or the growth of fungus. When water is trapped between the vinyl cover and the grill with little or no ventilation, rust and/or fungus is promoted.

Third, the light weight covers can blow off the grill with a heavy wind. This is particularly true of the loose fitting covers such as 90 in FIG. 4.

Fourth, the tight fitting covers such as 92 and 94 shown in FIGS. 5 and 6 often tear at their seams over time.

Fifth, vinyl grill covers can not be placed over the grill while the grill is hot. Thus, after cooking, one must wait for the grill to cool before covering it lest the cover melt.

SUMMARY OF THE INVENTION

It is therefore an object of the invention to provide an outdoor barbecue cooking grill cover which completely protects the grill.

It is also an object of the invention to provide an outdoor barbecue cooking grill cover which is ventilated to inhibit rust/fungus.

It is another object of the invention to provide an outdoor barbecue cooking grill cover which will not blow off the grill in a heavy wind.

It is still another object of the invention to provide an outdoor barbecue cooking grill cover which is durable and will not tear.

Still another object of the invention is to provide an outdoor barbecue cooking grill cover which can be placed over the grill while the grill is still hot.

In accord with these objects which will be discussed in detail below, the outdoor barbecue cooking grill cover of the present invention includes a free standing cover which is designed to fit the profile of the grill with an air space between the grill and the cover. The cover sits on the ground (or platform resting on the ground) and covers the entire grill including the legs of the grill.

A presently preferred outdoor barbecue cooking grill cover is made of molded heat resistant rigid plastic, has integral handles, is weighted at the bottom, includes at least one horizontal surface which can be used as a counter, and is vented in a manner to allow air to circulate between the cover and the grill but will still keep out rain and snow. The grill cover could also, for example, be secured by a weight resting on the counter surface when the grill is not in use.

According to another embodiment, tie down loops are provided on the cover so that it may be tied down to a deck or the like.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
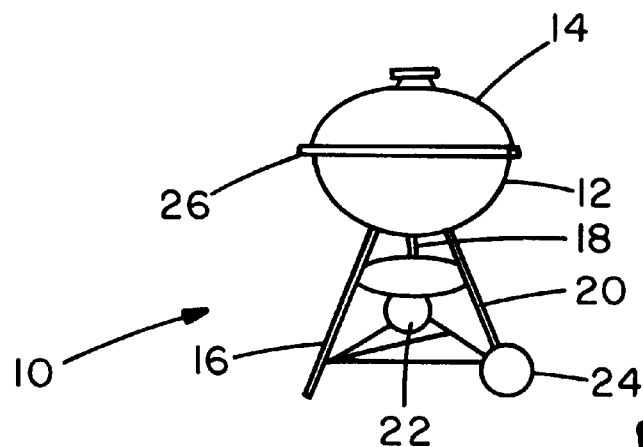
FIG. 1 is a perspective view of a prior art kettle-type outdoor barbecue cooking grill.
Figure 7:
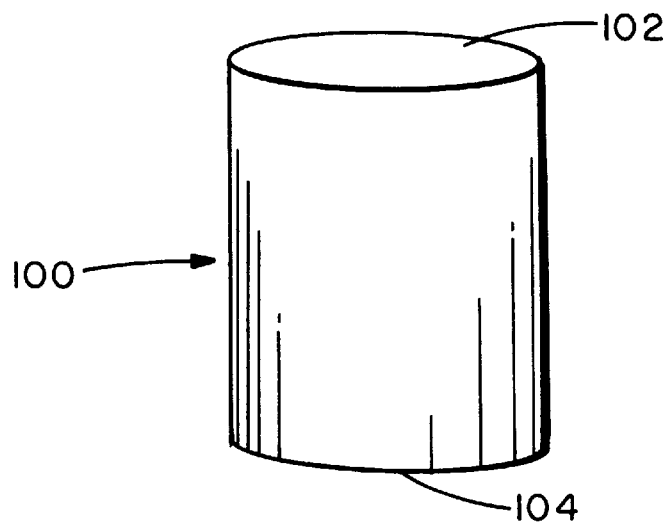
FIG. 7 is a schematic view of an outdoor barbecue cooking grill cover according to the invention for a kettle-type grill.

Referring now to FIG. 7, an outdoor barbecue cooking grill cover 100 according to the invention is a molded heat resistant rigid plastic cylinder with a flat top 102 and an open end 104. The cylinder is dimensioned to fit over a kettle-type grill such as the grill 10 shown in FIG. 1.

Figure 2:
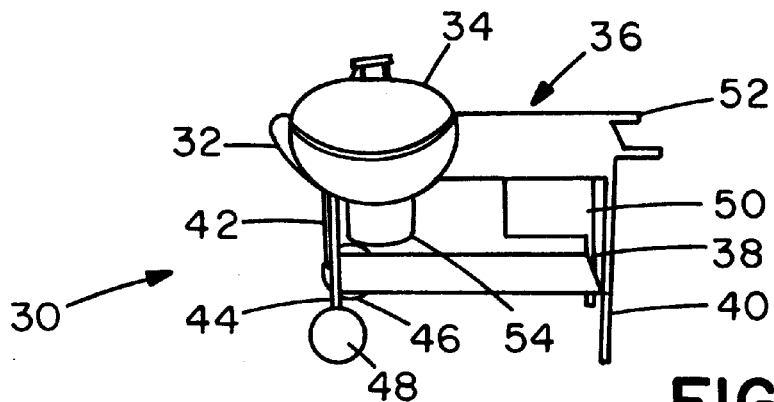
FIG. 2 is a perspective view of a prior art hybrid-type outdoor barbecue cooking grill.
Figure 8:
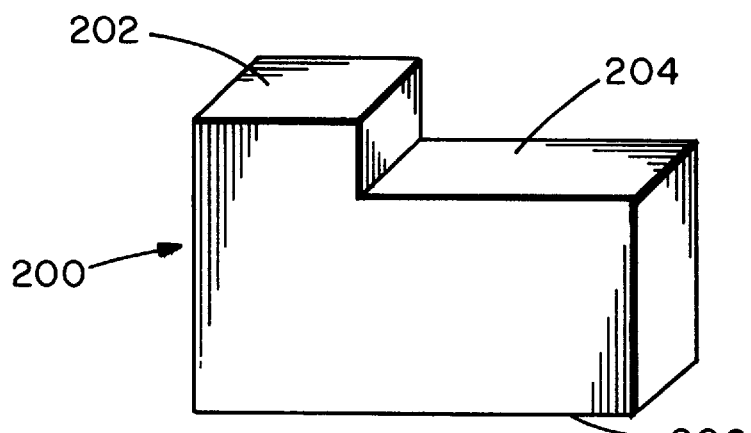
FIG. 8 is a schematic view of an outdoor barbecue cooking grill cover according to the invention for a hybrid-type grill.

Another embodiment of an outdoor barbecue cooking grill cover according to the invention is shown in FIG. 8. The outdoor barbecue cooking grill cover 200 according to the invention is a molded plastic rectilinear structure having two flat upper sections 202, 204 and an open lower end 206. The outdoor barbecue cooking grill cover 200 is dimensioned to fit over a hybrid-type grill such as the grill 30 in FIG. 2.

Figure 3:
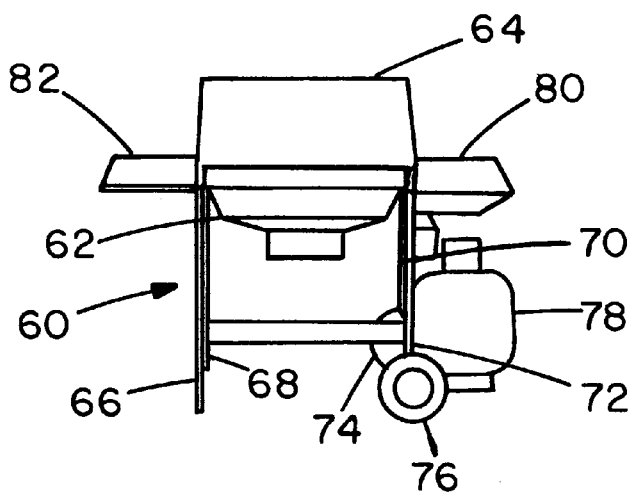
FIG. 3 is a perspective view of a prior art rectangular gas outdoor barbecue cooking grill.
Figure 4:
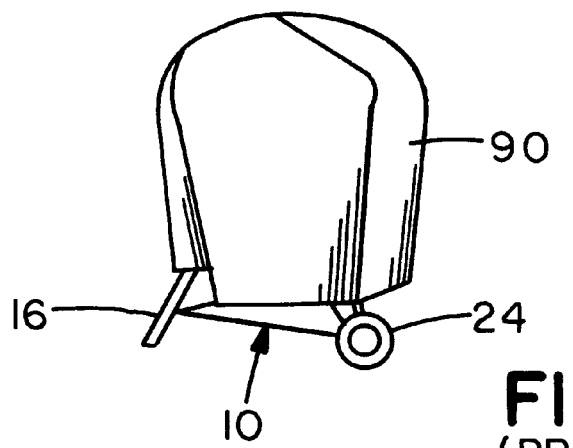
FIG. 4 is a perspective view of a prior art kettle-type outdoor barbecue cooking grill with cover.
Figure 5:
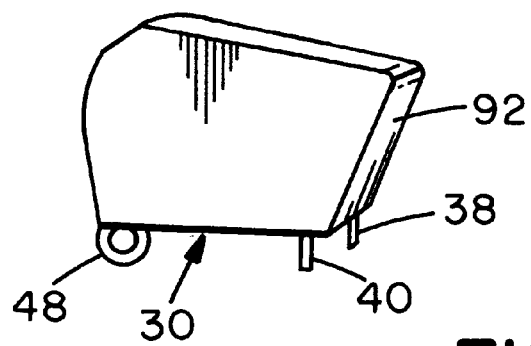
FIG. 5 is a perspective view of a prior art hybrid-type outdoor barbecue cooking grill with cover.
Figure 6:
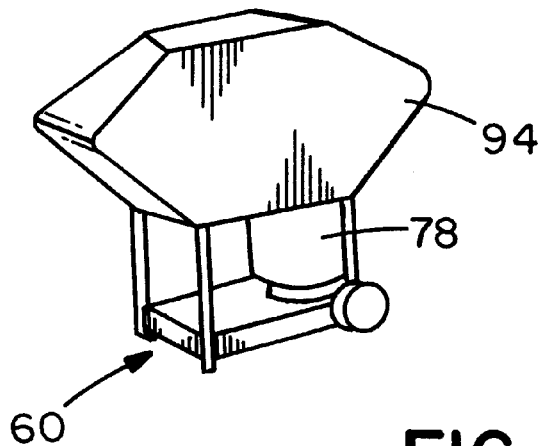
FIG. 6 is a perspective view of a prior art rectangular gas outdoor barbecue cooking grill with cover.
Figure 9:
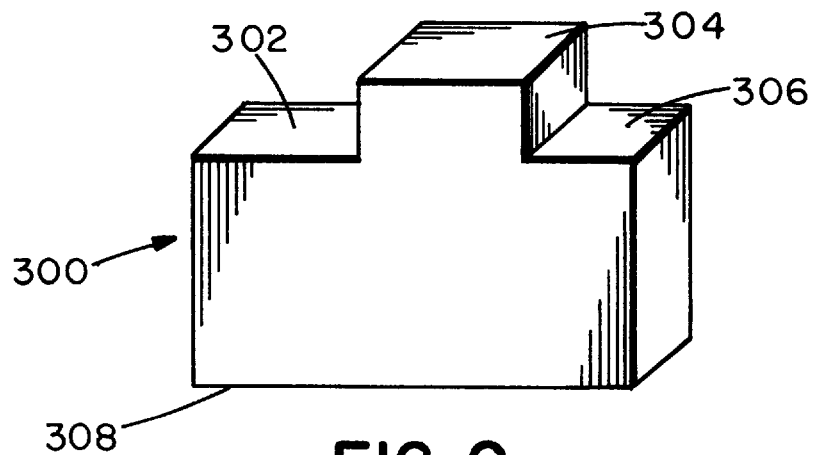
FIG. 9 is a schematic view of an outdoor barbecue cooking grill cover according to the invention for a rectangular gas-type grill.

Still another embodiment of an outdoor barbecue cooking grill cover according to the invention is shown in FIG. 9. The outdoor barbecue cooking grill cover 300 according to the invention is a molded plastic rectilinear structure having three flat upper sections 302, 304, 306 and an open lower end 308. The outdoor barbecue cooking grill cover 300 is dimensioned to fit over a rectangular gas-type grill such as the grill 60 in FIG. 3.

Each of the embodiments of FIGS. 7–9 has at least one flat surface which can be used as a counter to hold something. For example, when the cover is removed from the grill, the flat surface of the cover can be used to support food, condiments, or cooking utensils.

As mentioned above, each of the outdoor barbecue cooking grill covers is dimensioned to fit over a particular type of grill with air space between the cover and the grill. The fitting of the grill covers of the invention with respect to a corresponding grill is illustrated with reference to FIGS. 10–12.

Figure 10:
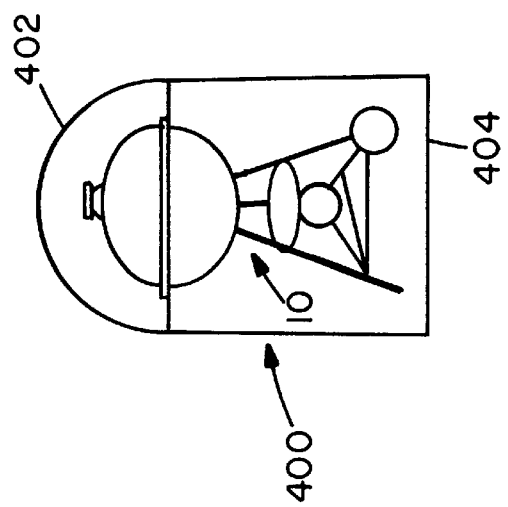
FIG. 10 is a schematic transparent view of an outdoor barbecue cooking grill cover according to the invention with a kettle-type grill.

Referring now to FIG. 10, an outdoor barbecue cooking grill cover 400 according to the invention is a molded plastic cylinder with a dome top 402 and an open end 404. The cover is dimensioned to fit over a kettle-type grill such as the grill 10 with air space between the cover and the grill.

Figure 11:
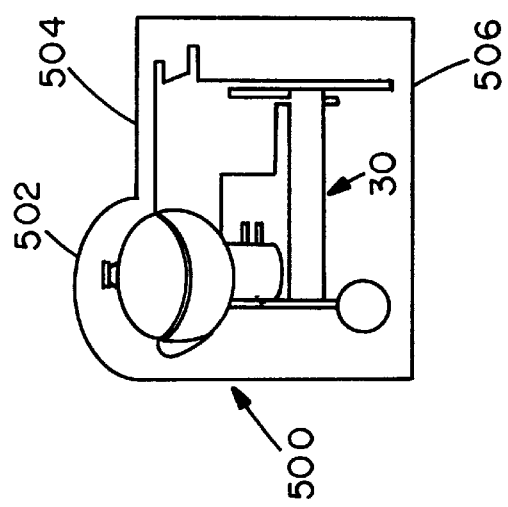
FIG. 11 is a schematic transparent view of an outdoor barbecue cooking grill cover according to the invention with a hybrid-type grill.

Another embodiment of an outdoor barbecue cooking grill cover according to the invention is shown in FIG. 11. The outdoor barbecue cooking grill cover 500 according to the invention is a molded plastic rectilinear structure having an upper dome portion 502, an upper flat portion 504, and an open lower end 506. The outdoor barbecue cooking grill cover 500 is dimensioned to fit over a hybrid-type grill such as the grill 30.

As mentioned above, it is preferred that the grill cover according to the invention have at least one flat surface. Thus, the embodiment of the cover 400 is not a preferred embodiment in terms of functionality although it may be considered by some to be aesthetically preferable to the embodiment 100 of FIG. 7.

Similarly, the dome portion 502 in the cover 500 may be considered to be an aesthetic feature whereas the flat portion 504 serves the function of a counter top.

Figure 12:
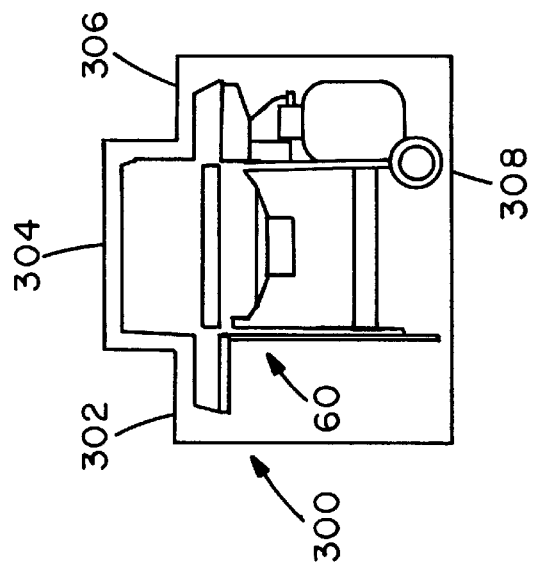
FIG. 12 is a schematic transparent view of an outdoor barbecue cooking grill cover according to the invention with a rectangular gas-type grill.

As seen in FIG. 12, it will be appreciated that in the case of a rectangular-type grill 60, the cover 300 provides three flat surfaces 302, 304, 206 which may function as counter tops. In all cases, it is preferred that the cover be dimensioned so that it fits over the grill without touching it and with some air space between the cover and the grill. This allows the cover to be placed over the grill while the grill is still hot.

As mentioned above, the outdoor barbecue cooking grill covers according to the invention preferably include features such as handles, weights, tie down loops, and vents.

Figure 13:
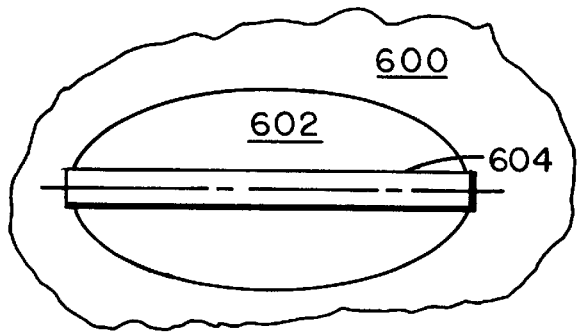
FIG. 13 is a broken side elevational view of a handle portion of an outdoor barbecue cooking grill cover according to the invention.
Figure 14:
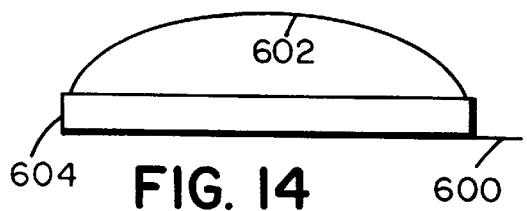
FIG. 14 is a section taken along line 14-14 in FIG. 13.

More particularly, a presently preferred handle is shown in FIGS. 13 and 14.

The grill cover 600 shown in FIGS. 13 and 14 includes a recess 602 which is transected by a grip 604. The recess 602 is dimensioned to receive an adult hand so that the hand may grip the grip 604. Preferably, two handles are provided at opposite locations on the grill cover.

Figure 15:
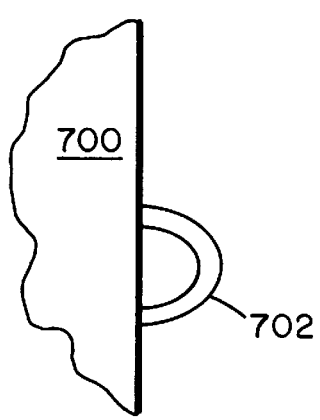
FIG. 15 is a broken side elevational view of a tie-down loop portion of an outdoor barbecue cooking grill cover according to the invention.

The grill cover 700 shown in FIG. 15 is provided with one or more tie down loops 702 through which a rope or cord (not shown) may be threaded so that the cover may be tied down to a deck or the like (not shown).

According to the preferred embodiment, however, the covers according to the invention are provided with weights to hold them down during heavy winds.

Figure 16:
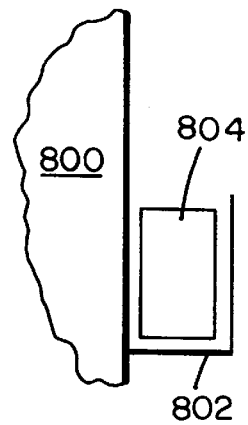
FIG. 16 is a broken side elevational view of a removable weight portion of an outdoor barbecue cooking grill cover according to the invention.

FIG. 16 shows a grill cover 800 which is provided with one or more pockets 802 for receiving removable weights 804. In this embodiment, the pockets are dimensioned to receive standard bricks supplied by the user. However, the pockets may be dimensioned to received custom sized weights which are sold together with the cover.

Figure 17:
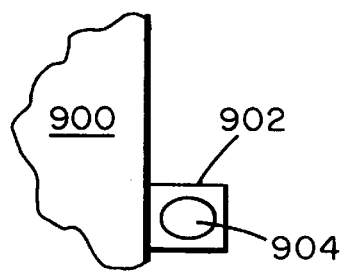
FIG. 17 is a broken side elevational view of an integral weight portion of an outdoor barbecue cooking grill cover according to the invention.

FIG. 17 shows another embodiment of a weighted cover 900 where sealed pockets 902 carry weights 904.

According to this embodiment, the weights 904 are insert molded into the plastic cover during manufacture. The weights are preferably located at or near the open end of the cover.

As mentioned above, a preferred embodiment of the invention includes one or more vents so that when a grill is covered for a relatively lengthy time it does not get moldy or rusty under the cover.

Figure 18:
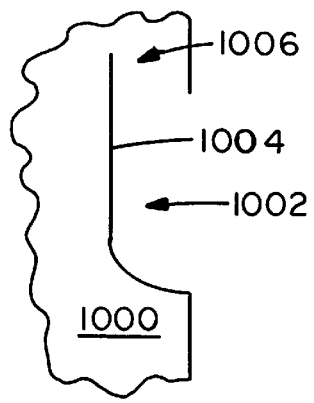
FIG. 18 is a broken side elevational view of a weather-proof vent portion of an outdoor barbecue cooking grill cover according to the invention.

FIG. 18 shows an embodiment of a weatherproof vent which also doubles as a handle. The outdoor barbecue cooking grill cover 1000 includes a side wall opening 1002 which is defined by a recessed wall portion 1004 which opens at 1006 to the interior of the cover above the opening 1002.

Preferably, the recessed wall portion 1004 is recessed an amount sufficient to allow an adult hand to fit into the opening 1006. The offset locations of the openings 1002 and 1006 allow air to flow into and out of the cover 1000 but do not easily permit rain/snow to enter the cover.

Those skilled in the art will appreciate that a more complicated baffle arrangement may also be provided which gives even greater assurance that the vent does not permit rain or snow to enter the cover. The vent(s) helps to prevent rust and mildew and also allows a hot grill to cool after the cover is placed over the grill.

There have been described and illustrated herein several embodiments of an outdoor barbecue cooking grill cover. While particular embodiments of the invention have been described, it is not intended that the invention be limited thereto, as it is intended that the invention be as broad in scope as the art will allow and that the specification be read likewise. For example, as previously indicated, the grill cover contemplated by the invention could be secured by a weight resting on the aforementioned "counter surface" when the grill is not in use.

Accordingly, it will be appreciated by those skilled in the art that yet other modifications could be made to the provided invention without deviating from its spirit and scope as claimed herein.

What is claimed is:

1. An outdoor barbecue cooking grill cover comprising a rigid structure dimensioned to cover the entire grill and provide an air space between the cover and the grill when the cover is in use, and a removable weight to hold said cover in place.

2. An outdoor barbecue cooking grill cover according to claim 1 wherein said rigid structure further comprises a pocket for receiving said removable weight.

3. An outdoor barbecue cooking grill cover comprising a rigid structure dimensioned to cover the entire grill and provide an air space between the cover and the grill when the cover is in use and an integral weight formed in a portion of said rigid structure.

4. An outdoor barbecue cooking grill cover comprising a rigid structure dimensioned to cover the entire grill and provide an air space between the cover and the grill when the cover is in use, and a means for securing said rigid structure, wherein said means for securing further comprises a tie down loop formed in said rigid structure.

5. An outdoor barbecue cooking grill cover comprising a rigid structure dimensioned to cover the entire grill and provide an air space between the cover and the grill when the cover is in use, and a removable weight, wherein said rigid structure is a heat resistant plastic and includes a pocket for receiving said removable weight.

6. An outdoor barbecue cooking grill cover comprising a rigid structure dimensioned to cover the entire grill and provide an air space between the cover and the grill when the cover is in use, wherein said rigid structure is a heat resistant plastic, and an integral weight formed in a portion of said rigid structure.

7. An outdoor barbecue cooking grill cover according to claim 6 wherein said weight is insert molded in said rigid structure.

8. An outdoor barbecue cooking grill cover comprising a rigid structure dimensioned to cover the entire grill and provide an air space between the cover and the grill when the cover is in use, wherein said rigid structure is a heat resistant plastic, and a tie down loop formed in said rigid structure.

9. A freestanding outdoor barbecue cooking grill cover comprising a rigid plastic structure dimensioned to conform to the dimensions of the outdoor barbecue cooking grill with air space between the cover and the grill when the cover is in use and a removable weight to hold said cover in place, said rigid structure including a pocket for receiving said removable weight, an integral handle and an air vent which permits the passage of air but which inhibits the passage of rain and snow.

10. A freestanding outdoor barbecue cooking grill cover comprising a rigid plastic structure dimensioned to conform to the dimensions of the outdoor barbecue cooking grill with air space between the cover and the grill when the cover is in use, said rigid structure including, an integral handle, an air vent which permits the passage of air but which inhibits the passage of rain and snow, and an integral weight formed in a portion of said rigid structure.

11. An outdoor barbecue cooking grill cover according to claim 10 wherein said weight is insert molded in said rigid structure.

12. A freestanding outdoor barbecue cooking grill cover comprising a rigid plastic structure dimensioned to conform to the dimensions of the outdoor barbecue cooking grill with air space between the cover and the grill when the cover is in use, said rigid structure including an integral handle, an air vent which permits the passage of air but which inhibits the passage of rain and snow, and a tie down loop formed in said rigid structure.

* * * * *